A. H. HELTBERG.
CASH REGISTER.
APPLICATION FILED DEC. 26, 1906.

923,172.

Patented June 1, 1909.
6 SHEETS—SHEET 1.

Witnesses:

Inventor:
A. H. Heltberg
Attorney

A. H. HELTBERG.
CASH REGISTER.
APPLICATION FILED DEC. 26, 1906.

923,172.

Patented June 1, 1909.
6 SHEETS—SHEET 2.

Witnesses:
W. P. Burke
Alvin G. White

Inventor:
A. H. Heltberg
by M. Wallan White
Attorney

A. H. HELTBERG.
CASH REGISTER.
APPLICATION FILED DEC. 26, 1906.

923,172.

Patented June 1, 1909.
6 SHEETS—SHEET 3.

Fig. 6.

Witnesses:
W. P. Burk
Alvin E. White

Inventor:
A. H. Heltberg
by M. Mallau Mil
Attorney

A. H. HELTBERG.
CASH REGISTER.
APPLICATION FILED DEC. 26, 1906.

923,172.

Patented June 1, 1909.
6 SHEETS—SHEET 4.

Witnesses
W. P. Burke
Alvin E. White

Inventor:
A. H. Heltberg
by [signature]
Attorney

A. H. HELTBERG.
CASH REGISTER.
APPLICATION FILED DEC. 26, 1906.

No. 923,172.

Patented June 1, 1909.
6 SHEETS—SHEET 5.

Witnesses.
W. P. Burk
Alvin G. White

Inventor:
A. H. Heltberg
by
Attorney

A. H. HELTBERG.
CASH REGISTER.
APPLICATION FILED DEC. 26, 1906.

928,172.

Patented June 1, 1909.
6 SHEETS—SHEET 6.

Witnesses:

Inventor:
A. H. Heltberg

UNITED STATES PATENT OFFICE.

ALF HERRE HELTBERG, OF CHRISTIANIA, NORWAY.

CASH-REGISTER.

No. 923,172.	Specification of Letters Patent.	Patented June 1, 1909.

Application filed December 26, 1906. Serial No. 349,469.

*To all whom it may concern:*

Be it known that I, ALF HERRE HELTBERG, candidatus juris and manufacturer, citizen of Norway, residing at Professor Dahls Gade 22, Christiania, Norway, have invented new and useful Improvements in Cash-Registers, of which the following is a specification.

In cash registers as hitherto constructed a large number of complicated mechanisms are made use of. Apparatus of this kind is consequently expensive. Cash registers as in general use are provided not only with devices indicating the amount for the benefit of the purchaser, but also with an adding mechanism, which automatically adds the amounts of cash inserted and indicates the total amount at any time desired. This latter mechanism greatly increases the price of this kind of apparatus.

The present invention has for its object to provide a cash register of a simple kind, in order that it may be sold at a reasonable price, and thus be adopted even in small businesses. For this purpose the adding mechanism is dispensed with and especial care is taken to decrease the keys to the lowest possible number. At the same time the register affords full control to the proprietor of the cash transactions made.

The invention is illustrated in the accompanying drawings, in which:—

Figs. 14–19 show to a larger scale the construction of the controlling or indicating device for the operator.

The principal feature of the invention consists in the amount (by pushing keys) being printed by means of type operating upon a paper strip arranged on a carriage, which on each depression of a key makes a step laterally in the known manner as in typewriters. The amount thus printed on the paper strip is fed forward during the pulling out of the drawer behind a glazed aperture, through which the amount may be observed and checked by the purchaser. In using this arrangement it is sufficient to have 12 keys, one for each number from 0 to 9, one for the "comma" or decimal point and one for adjusting the carriage.

Referring first to Figs. 1–5 of the drawing the carriage frame 1 is provided with a paper supply roller 2, two feeding rollers 3, 4, a paper winding roller 5 and a spring drum 6, the latter having a toothed wheel 7 in mesh with a pinion 8 on the shaft of roller 5. The paper passes around an angular leading plate 9 which is attached to the frame 1, the two side parts of which being connected by stays 10, 11. The force of the spring drum 6 is sufficient for winding up the paper around roller 5, when the paper has been fed forward by the rollers 3, 4, but said force is too small to overcome the friction of the paper against the leading plate 9. From the plate 9, the horizontal part of which lies above the ink-ribbon 12, and the vertical part behind the glazed opening 13 in the wall of the casing, the paper passes between both feeding rollers 3, 4, the upper roller 4 being acted upon by the spring 4', and then up to the winding roller 5. The carriage is supported partly by the square shaft 14 of the roller 3 and partly by a fixed bar 15, upon which travels the rear roller 16 of the carriage. The square shaft 14 in addition to supporting the carriage also serves to turn the roller 3 a quarter of a revolution each time the drawer 17 (Fig. 2) is pulled out. Roller 3 is therefore fixed to two cylindrical sleeves 18, 19, (Fig. 3) which are in turn journaled in parts of the frame 1 and provided with square bores for the shaft 14.

The types 20 are attached in the same manner as in type writers to levers 21 arranged in a curve so that all the types strike at the same point. Said levers are connected by short counter levers 22 and bars 23 with their respective key arms 24. Under all of these latter lies a rail 25 connected through a bar 26 with a step-by-step mechanism 27 of the usual kind. It is unnecessary to describe the latter as it is of known construction and acts in conjunction with a weight 28, a spring or the like so as to give the carriage a lateral step corresponding to a constant character interval each time.

In order that the key arms 24 which are stamped from a plate of uniform thickness may be operated they are guided not only by the common pivot 29 but also near their forward and rear ends by means of pins 30, 31, fastened on both sides of each arm 24 to wooden bars 32, 33 below.

Figure 1:
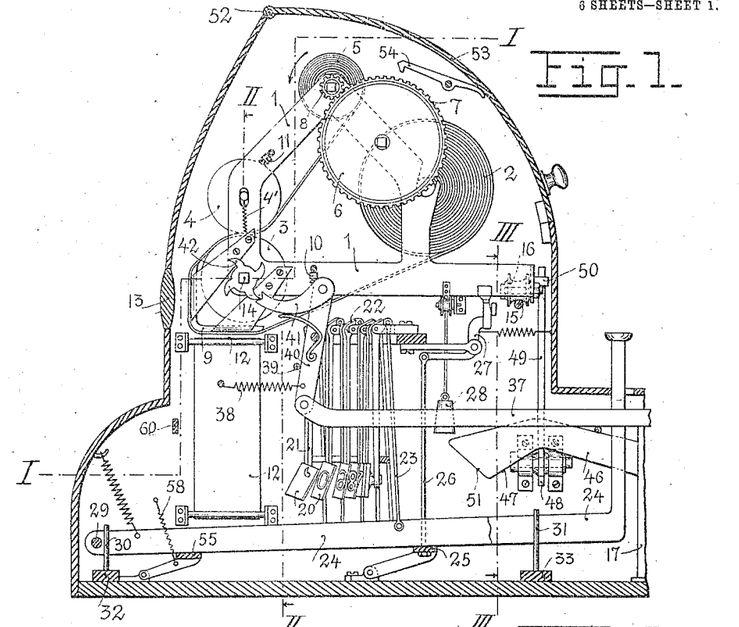
Figure 1 is a longitudinal sectional front view of the register.
Figure 2:
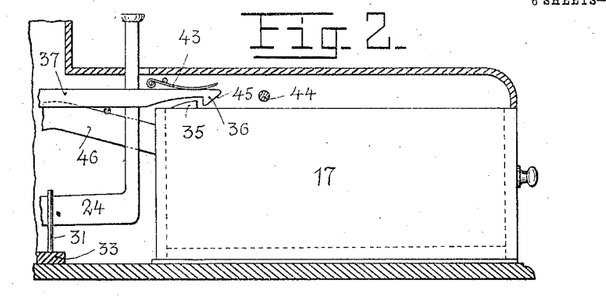
Fig. 2 is a similar view of the rear part.
Figure 3:
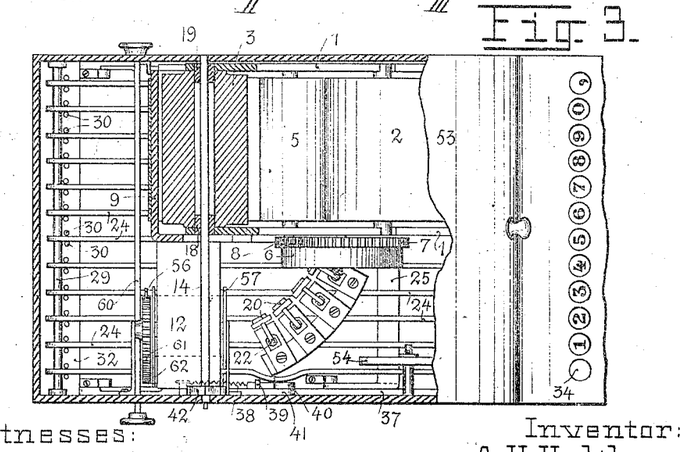
Fig. 3 is a sectional plan view on the line I—I, Fig. 1, the carriage being in final position.
Figure 4:
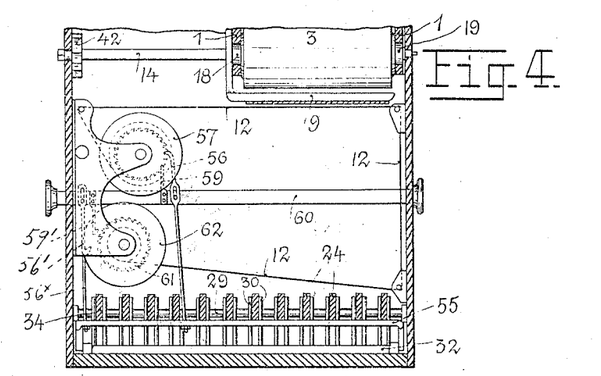
Fig. 4 is a cross section on line II—II Fig. 1, viewed from the right, the carriage being in final position.
Figure 5:
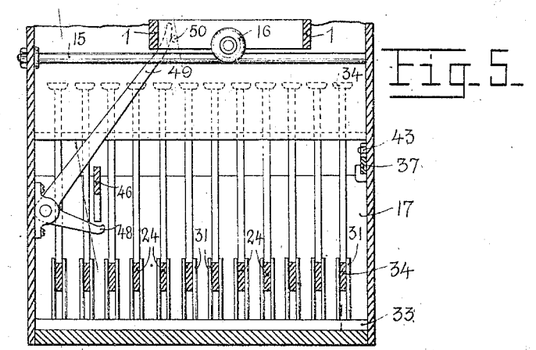
Fig. 5 is a cross section on line III—III Fig. 1, viewed from the left, the carriage being in initial position.

When it is desired to insert an amount of cash the operator first pushes the adjustment key 34 that number of times as will bring the carriage to such a position that the comma or decimal point will be in alinement with the commas in all the preceding amounts. The printing is then effected by depressing the number keys in question and the comma key successively. When the amount is printed the carriage is in final position as shown in Figs. 3 and 4 and the amount has been printed by means of the ink-ribbon 12 upon the part of the paper strip which is under the horizontal part of the leading plate 9. The drawer is then pulled out. Two sorts of movements are caused to occur, namely a feeding of the paper and a returning movement of the carriage to its initial position. The paper feeding is effected by a projection 35 (Fig. 2) attached to the drawer and engaging a bar 37 provided with a hook 36. The forward end of the bar 37 thereby oscillates a double lever 40 forced by spring 38 against a stop 39 and carrying at its upper end a pawl 41 engaging a 4-toothed wheel 42 keyed to the square shaft 14 directly inside the left side wall of the casing (see Figs. 3 and 4). When the bar 37 is pulled backward, the wheel 42 and shaft 14 are rotated exactly a quarter revolution, the hook 36 pressed down by the spring 43 being lifted at the right moment and released from the nose 35 by means of the fixed stopper 44, acting upon the inclined part 45 of the hook. By this quarter-revolution of the shaft 14 and roller 3 the printed part of the paper strip travels up behind the glass 13, so that the amount may be observed by the purchaser, when the carriage is returned to initial position by means of the inclined part 46, attached to the foremost wall of the drawer 17. The inclined plane 47 of said part acts on the short arm 48 of a bell crank lever (Figs. 1 and 5), the long arm 49 of which is thereby swung to the left taking with it a pin 50 attached to the carriage in order to return the same to initial position. Should the carriage be moved laterally one or more steps, while the drawer is in its outer position, which might take place through the involuntary pushing of a key, the carriage will again be returned by the foremost inclined plane 51 of the part 46.

When the paper band is taken out of the apparatus the cover 53 is opened and turned up on its trunnions 52. The carriage being now, as usually, in its initial position, a hitherto inactive pawl 54 (Figs. 1 and 3) falls down between two teeth of the wheel 7 and holds the same against the influence of the spring in the barrel 6, so that the winding roller 5 with the shaft and pinion 8 may be removed without difficulty.

The ink-ribbon 12 is fed forward one step in the well-known manner each time a key is depressed this movement being obtained by the mechanism indicated in Fig. 4. Upon depression of one of the keys, the rail 55 lying beneath the arms 24 will move downward, whereby a spring pawl 56 engages one or two teeth of the ratchet wheel attached to the ink-ribbon drum 57. When the key is released, the rail, by means of spring 58 (Fig. 1) is drawn upward, whereby the pawl 56 turns the drum 57 with the ink-ribbon one step forward. The small spring detent 59 serves to hold fast the drum during the downward movement of the pawl 56. The movement of the ink-ribbon is reversed by pushing the bar 60 to the right, whereby pawls 56 and 59 are put out of action, while similar pawls 56 and 59' engage the ratchet wheel 61 on the other ink-ribbon drum 62. Pawl 56' is connected to bar 65 by rod 56×.

The constructional form shown in Figs. 6–20 is based upon the same main principle as the form above described and is also constructed in such a manner, that only 11 keys are necessary, namely one for each of the numbers 0 and 1 to 9 and one for the comma or decimal point. A device is further provided (Figs. 14–19), whereby the amount printed upon the paper strip or band is automatically indicated for the operator, who may thus control the printing of the desired amount.

Figure 20:
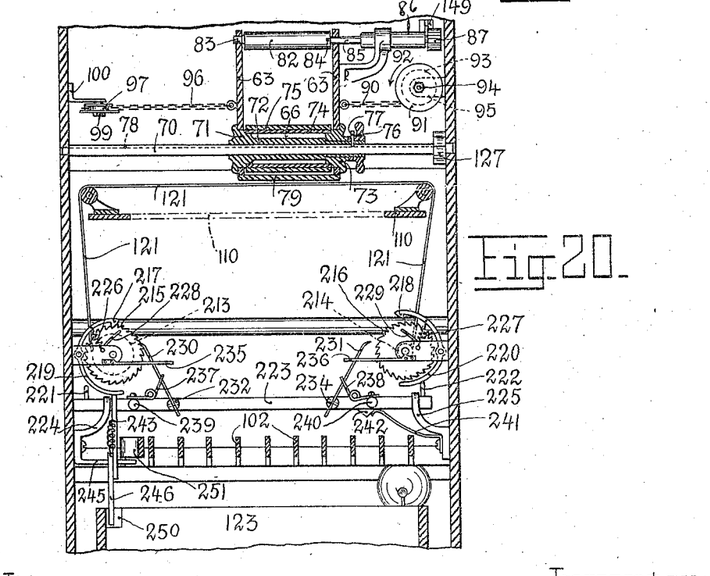
Fig. 20 is a vertical section on line XIII—XIII Fig. 6.

The carriage frame comprises two side pieces 63 attached together partly by the rack 64 and the rear connecting piece 65 and partly by one of the feeding rollers 66 as shown in Fig. 20. The two feeding rollers 66, 67, are arranged side by side, one 66 being journaled in the frame piece 63 and the other journaled with its trunnions 68 in essentially horizontal slots 69 in the frame the said roller being pressed by springs (Fig. 9) against the first roller 66. The latter surrounds the round feeding shaft 70 (see Fig. 20) passing across the apparatus. The roller 66 is integral with the one end disk 71, the outer flange of which engages the outer side of the left frame part 63. On the long sleeve 72 of the roller is attached the other end disk 73, the outer flange of which engages the outer side of the right part of the frame 63. Between both disks 71 and 73 is clamped a cylindrical sheet metal sleeve 74, to which the caoutchouc layer 75 is cemented. The disks are held together by a nut 76 screwed on the extended sleeve 72 and secured in position by a pin 77, which also projects into a longitudinal groove 78 in the feeding shaft 70 thereby maintaining the connection between this latter and the roller 66 during the movements of the carriage in the longitudinal direction of the shaft 70. The nut 76 is preferably provided on its periphery with ribs so as to form a hand wheel to be turned when desired to feed the paper forward. The carriage is supported not only by the shaft 70 but also by the cross bar 114, upon which runs the wheel 113.

The paper band 88 passes from roller 89 down between both caoutchouc rollers 66, 67, then under the plane 79, attached between both frame parts 63, beneath roller 66, then around a bar or roller 80 arranged in the foremost and lower part of the carriage and finally up to the winding roller 81. The core or shaft 82 of the latter is journaled with one trunnion 83 (Fig. 20) in the left part of the frame 63, while the other end has a cross groove engaged by a cross rib 84 in the inner end of a pin 85 passed through and journaled in a sleeve 86 attached outside the right frame part 63. The outer end of pin 85 carries a pinion 87. The pin 85 is movable in the sleeve 86, but is pressed constantly against the shaft 82 by means of an inner spring. On the pin being forced outwardly against the spring, the rib 84 passes out of its groove and shaft 82 with the paper wound around it may be easily taken out.

The carriage is moved laterally to the right by a chain 90 attached to the right frame part 63 and coiled around a drum 91 tending to turn in the direction of arrow 92, (Fig. 20) under the influence of a spiral spring inclosed in the barrel 93 which is integral with the roll 91 and rotatable on a pin 94 fixed in the part 95 which is in turn attached to the right wall of the casing.

To the left part of the frame 63 is attached another chain 96 passing round a horizontal roller 97 to the upper end of an arm 98 (Figs. 7, 8 and 9) by the oscillation of which the carriage is returned to initial position as hereinafter described. The roller 97 is carried by a vertical pin 99 in a part 100 attached to the left casing wall.

Each time a key 101 is depressed, the cross bar 103 lying beneath all the key arms 102 is also moved. Said bar is connected through link bars 104, 105 (Fig. 8) with the forwardly projecting levers 106, 107 of the shaft 108 of the step-by-step mechanism. The left end of said shaft is journaled in the left casing wall and the right end is supported by an arm 109 screwed to the horizontal partition 110 extending across the upper part of the apparatus and attached to the casing walls by two lugs 111 and 112. Each time a key is acted upon the carriage will be caused to take a lateral step to the right by means of the usual step-by-step mechanism 115 and the pull of the chain 90. Each key arm 102 is connected through a bar 116 with the short end of its type lever 117 in the same manner as in type-writers, the levers 117 being journaled in U-shaped bows 118 (Figs. 6 and 7) attached by screws 119 along the semicircular front edge of the partition 110. The types 120 all strike at the same place against the ink-ribbon 121, which prints its ink upon the paper band 88, the latter passing between the plane 79 and the ink-ribbon.

When the amount has been printed upon the paper band, this latter is fed forward around the roller 80 and up behind the glazed opening 122 in order to be seen by the purchaser. This is automatically effected by the rotation of the shaft 70. At the same time the paper band is wound upon the roller 81 by the rotation of the shaft 82. The two latter movements are in this case effected by pulling out the cash drawer 123, whereby also the ink-ribbon is fed one step laterally. A double lever 125 serves (Figs. 6, 12 and 13) to rotate the shaft 70 this lever 125 being pivotally attached to the right side of the casing at 124 and provided at its upper end with a pawl 126, which is held under the action of a spring in engagement with a ratchet wheel 127 keyed on the feeding shaft 70. The lower end of lever 125 is pressed by the spring 128 against the stop 129 and carries a pivoted bell crank lever 130 held in engagement with a stop 132 on the lever 125 by means of spring 131. The downwardly turned end of the lever 130 projects into the space between the right side walls of the casing and the drawer into the path of a pin 133 attached to the drawer.

Lever 125 slides along a guiding piece 134 (Figs. 12 and 13) fixed to the right casing wall; the rear end of the guiding piece is tapered. Behind the part 134 is arranged a releasing nose 135, forming in combination with piece 134 a traveling path 140 for the lever 130 and serving to release said lever from the pin 133, after the lever 125 has swung a predetermined amount. Side by side with the lever 125 is a second double lever 136 (Fig. 6), pivotally attached to the right wall of the casing at 137 and carrying at the upper end a toothed segment 138, which when the carriage comes to its final position will mesh with the pinion 87, while the lower end of lever 136 also projects down into the space between the right walls of the casing and the drawer 123. The levers 125 and 136 lie side by side, but to prevent their interfering with each other during their oscillation, one 125 travels at one side of a guiding band 139, (Fig. 6) between the same and the casing wall to which the band is attached, while the other lever 136 travels at the other side of said guiding band. By means of the spring 141 acting upon the segment 138 the lever 136 is forced against a stop 142 on band 139.

The lower end of the lever 136 has a pivoted triangular piece 143 (Figs. 12 and 13) forced by the spring 144 against the stop 145 on the lever 136 and a bell crank piece 146 is forced by the spring 147 against the stop 148 upon the triangular piece 143. The downwardly turning arm of the part 146 projects into the path of the pin 133 above mentioned but travels between the side wall of the drawer and the releasing nose 135.

The amount having been printed on the paper band, the drawer 123 is pulled out, and the pin 133 will first strike against the lower end of lever 130, this latter together with the lower end of lever 125, being swung backward against the influence of spring 128.

The upper end of lever 125 together with pawl 126 will now swing forward and rotate the ratchet wheel 127 one tooth, rotating also the shaft 70 such an amount, that the sum printed beneath the plane 79 is fed up behind the glass 122 and may be observed by the purchaser. During this the lever 130 travels into the rear end of the path 140 and is given a lateral movement toward the casing wall (see Fig. 13), by the nose 135 until it comes out of the path of the pin 133 and is released from the same and drawn back by the spring 128 to the position shown. Just before the pin 133 in this manner has fed completely forward the paper band, the pin also meets the lower end of the arm 146, which is now carried with it in the backward movement together with the lever 136, the spring 144 being of such a strength, that the lever 136 will partake of the movement but the spring is not able to tear off the paper band during the winding-up of the same. By this backward movement the upper end of lever 136 and the toothed segment 138 are swung forward, thereby rotating pinion 87 together with the pin 85, shaft 82 and roller 81 in right direction for winding up the paper. As soon as the paper is wound tight the spring 144 yields to permit the arm 146 to swing back and the pin 133 to pass beneath the same. Then the parts 146, 143 are returned to the indicated position by the spring 144. By this arrangement the paper band is always wound up tightly upon the roller 81 irrespective of the varying diameter of the same, and this has taken place, before the drawer is pulled completely out, so that the band is always tight, when the amount appears before the purchaser through the glass 122. The paper is prevented from unwinding by means of the pawl 149 engaging the pinion 87 and pivoted to the sleeve 86 (Figs. 7, 8 and 20). This pawl also preliminarily prevents the segment 138 from returning under the influence of the spring 141. When the drawer 123 is again pushed in, the springs 147 and 131 yield (Fig. 12), so that pin 133 may move forward passing beneath the lower end of the levers 146, 130 to the initial position shown in Figs. 6 and 12.

When the drawer is pushed in, the carriage is automatically drawn to the left to its initial position. This is effected by the double lever 98 rotatably attached at 150 (Fig. 9) to the left wall of the casing. The upper end of lever 98 is connected with the chain 96 as already mentioned and its lower end has a pivoted bell crank piece 151 projecting into the space between the left side walls of the drawer 123 and the casing into the path of a pin 152 on the drawer. Said piece 151 is held by the spring 153 against the stop 154 on the lever 98 this latter being stopped in the position indicated by the pin 155 fixed to the left wall of the casing.

When the drawer is pulled out, the pin 152 travels beneath the lower end of the piece 151, which swings aside and again snaps back. When the drawer is pushed in, the pin acts on the rear of the part 151, taking this along with it together with the lever 98, the upper end of which swinging backwardly draws the carriage to the left up to the initial position by means of the chain 96. The part 151 during this movement is released from the pin by the mechanism shown in Figs. 9 and 11. This mechanism is of the same nature as the releasing mechanism (Figs. 12 and 13) the parts 133, 134, 135, corresponding to the parts 152, 156, 157.

By the automatic returning mechanism as described the carriage is moved so far to the left, that a type will print on the paper band a number directly in front of the place at which the comma or desired point is printed. If thus for instance 0.01 crowns, marks, dollars, francs etc., are inserted first the 0-key is pushed, then the comma-key, then the 0-key and finally the 1-key. The character first printed will therefore always be that having its place directly before the comma. In this manner amounts from 0.01 to 9.99 crowns, marks etc., may be inserted in the apparatus, such amounts being those that usually occur. If now an amount between 10,00 and 99,00 is inserted, the lever 158 (Figs. 9 and 10) is swung back through a corresponding angle. Said lever 158 is pivoted on the same pin 150 as the double lever 98 and projects upward at the left side through the cover of the casing, so that its handle is accessible and may be swung by hand. The lever 158 has beneath the pin 150 a tail 159, which by the spring 160 is held against a stop 161 on the lever 98, which latter thereby partakes of the movement, when the lever 158 is swung backward. The upper end of lever 158 travels in an opening 162 having at one side 3 stopping planes 163, 164 and 165. When the lever 158 is swung back, until it abuts against the plane 163, the carriage is moved so far to the left that the amount from 0,01 to 9.99 may be printed and inserted as already stated. When the lever is swung back to the plane 164, however, the carriage takes up a position in which the first number is printed at the place for tens of crowns, marks etc. and when the lever is moved back to the plane 165, amounts from 100,00 to 999,99 may be printed and inserted. In most cases this is sufficient but it should be understood, that the invention is not limited in this respect, because the carriage and the paper band may be made so wide without increasing the number of keys or types and the casing provided with so many stopping planes 163, 164, 165 etc., that any desired amount may be printed and inserted. All amounts irrespective of their size will thus be printed on the paper band in such manner, that all commas are placed vertically beneath each other, so that the amounts may be easily added together.

In order to prevent the drawer from being opened, before the printing of an amount is completed the drawer is locked by a pawl 166 (Fig. 6) which turns on a pin 167 attached to the left wall of the casing. Said pawl by a spring 169 acting upon its extremity 168 is normally drawn down against the stop 170, whereby the front edge of the pawl lies behind a locking piece 171 attached to the left side of the drawer, which by this means is prevented from being withdrawn. The pawl 166 is connected by the chain 172 with one arm 173 of a bell crank lever which is pivoted to the partition 110 (see Figs. 7 and 8) and the other arm 174 of which is connected by the chain 175 with the left side of the carriage 63. When the carriage is not in the final position indicated the chain 175 is slack and therefore the pawl 166 is in the locking position. But as soon as the carriage—after the last key has been acted upon—comes down to the final position, the chain 175 is tightened and lifts the pawl to the position shown by means of the parts 174, 173, and 172, so that the drawer may be withdrawn.

Figures 14, 17, 18, 19:
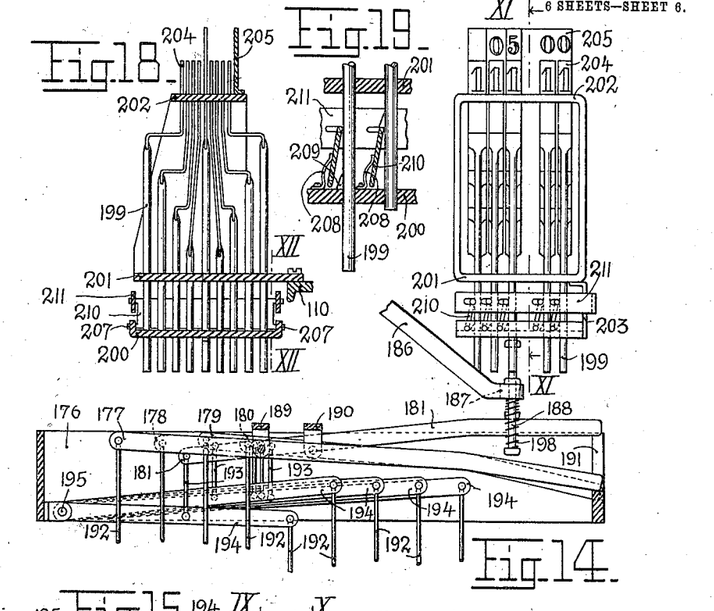
Fig. 14 is a longitudinal section on line VIII—VIII, of Fig. 15, together with a rear view of the amount indicating device.
Fig. 17 is a cross section on line X—X Fig. 15, viewed from the left.
Fig. 18 is a vertical section on line XI—XI Fig. 14, viewed from the right.
Fig. 19 shows on a larger scale a part of a vertical section on line XII—XII, Fig. 18.

In Figs. 14 to 19 is shown an indicating device by which the operator may control the correct printing of the desired amount on the paper band, as the same amount as that printed on the band, is automatically indicated before the operator by means of said device. This device comprises three combined mechanisms, first the frame 176 attached between the side walls of the apparatus and carrying nine cross levers 177 to 185 inclusive each lever being connected to its individual key arm 102, and secondly an arm 186 fixed to the rear cross piece 65 of the carriage and carrying 9 striking pins 188, and thirdly the device indicating the proper amount, Figs. 14, 18 and 19. The frame 176 is provided with two bows 189, and 190, the first of which carries the pivots for the raising levers 177, 178, 181 and 182 connected respectively with the key arms for the types 1, 2, 5 and 6 (Fig. 16), while the other bow 190 carries the pivots for the raising levers 179, 180, 183, 184 and 185 connected respectively with the key arms for the types 3, 4, 7, 8 and 9 (Fig. 17). The key arms for type "0" and for "comma" are not represented among the raising levers. The latter are guided laterally by their free ends traveling in vertical slots 191 in the right end wall of the frame 176. Through the bars 192 the raising levers 177, 178, 179, 180 are connected directly with their individual key arms for the types 1, 2, 3 and 4, while the raising levers 181, 182, 183, 184, 185 are connected through bars 193 with their individual auxiliary levers 194, the ends of which are connected through similar bars 192 with their individual key arms for the types 5, 6, 7, 8, 9 (see also Fig. 8). The auxiliary levers 194 are pivoted to a common pivot 195 attached to the left end wall of the frame 176. Each bar 192 is in adjustable connection with its individual key arm 102 for instance by means of a bow 196 having at the bottom a vertically adjustable screw 197. Said screws 197 are so adjusted that the key arms 102 in their lower position hold the right end of their raising levers lifted up to the same height as shown for the lever 181 (Fig. 14).

Figure 15:
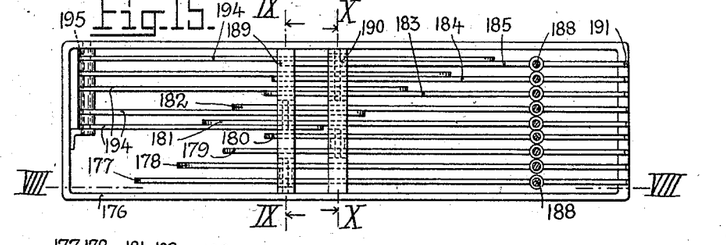
Fig. 15 is a corresponding plan, the latter device being removed.
Figure 16:
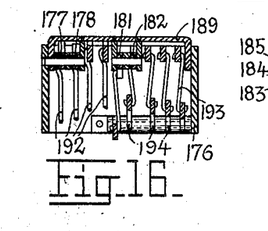
Fig. 16 is a cross section on line IX—IX Fig. 15, viewed from the right.

The striking pins 188 are pressed downward by surrounding springs 198 and are situated right above their individual raising levers as indicated in Fig. 15.

The proper amount indicating device comprises 5 series of raising or indicating pins 199, viz.: one series for hundreds, one series for tens and one series for units of crowns, marks, francs etc. further one series for tenths and finally one series for hundredths of crowns etc. Each series contains 9 raising pins, one for each of the key arms for the types 1 to 9. Therefore there are 5x9 or 45 raising pins. Each of them is guided during its vertical movement by two horizontal plates 200 and 201. The pins are at their upper end bent against each other as shown in Fig. 18 and are here flattened and provided at the rear with characters, so that all the 5 rear ones contain the character "1", the 5 next the character "2" and so on, until the 5 foremost ones contain the character "9". The upper flat ends 204 of the pins 199 are guided by a horizontal plate 202, forming together with the plate 201 and two side parts a frame in such a manner, that the said characters lie above the plate 202 as shown in Fig. 14. The plate 200 is connected by the part 203 to the plate 201, the foremost edge of which is attached to the rear edge of the partition 110. In front of each flat end 204 is fastened a plate 205 projecting up beyond the parts 204 and having at the rear side the characters "0" right above the four parts 204 to the right. The space above the part 204, that is the upper half of the plate 205, may be observed by the operator through the window 206 (Fig. 6) which is arranged in the rear wall of the casing. For each of the 5 series of raising pins is arranged a latching plate 210, having at its lower end pivots 207 projecting through holes in the upwardly-turned edges of the plate 200. Each latching plate has an inclined position and is pressed by a spring 208 against the pins in the series appertaining thereto (see Fig. 19). Further each pin 199 has at the side adjacent to its latching plate a side projection 209, which when the pin is raised forces the locking plate aside until the latter snaps back beneath the projection 209 and locks the pin 199 in its raised position. All the latching plates may be released by a bow 211, which may be moved laterally by depressing a button 212 (Fig. 8) protruding beyond the outer side of the right casing wall.

When the amount is printed upon the paper band, the series of striking pins 188 will always be beneath the series of raising pins 199 appertaining to the momentary position of the character indicating the amount, as the pins 188 are rigidly connected with the carriage and move laterally together with the same. When a key is acted upon therefore the corresponding raising pin 199 of the respective series will be lifted, the part 204 with the same character as the key will move up and cover the character "0" on the plate 205. In Fig. 14 the 5th raising pin of the unit-series is lifted up. When the key for the 0-type is pushed down, a part 204 does not rise, as the plate 205 already indicates the number "0". From this is understood, that after the amount is printed corresponding pins 199 and parts 204 have been lifted and the pins are locked by the noses 209 and the latching plates 210, so that the same amount is visible for the operator. As soon as the amount has been observed the button 212 is depressed whereby the lifted pins 199 fall by their own weight.

Figure 6:
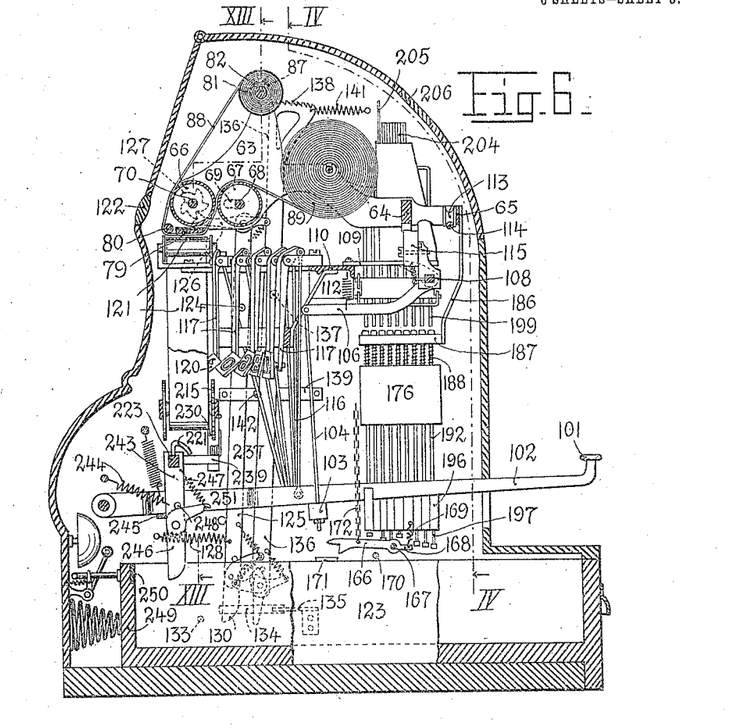
Fig. 6 is a longitudinal section through the register in a modified construction.
Figure 7:
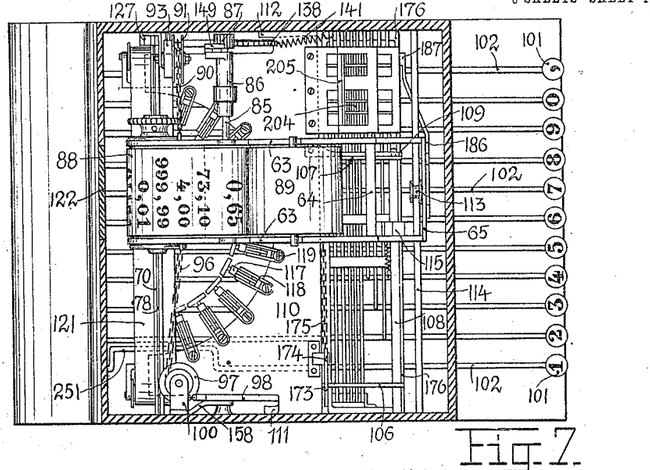
Fig. 7 is a corresponding plan, the upper part of the casing being broken away.
Figure 8:
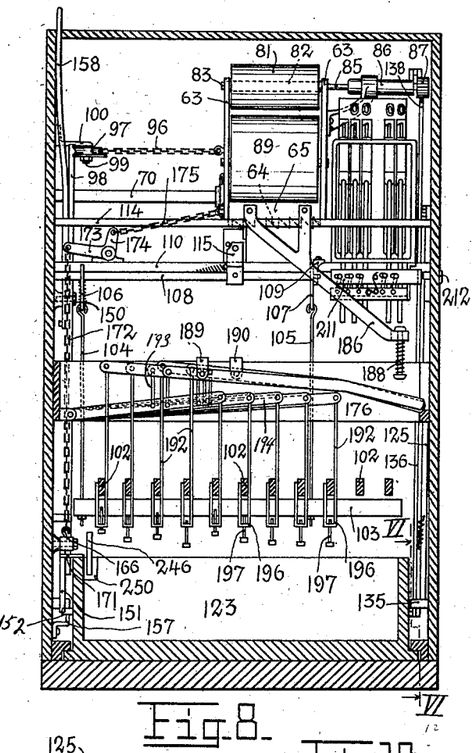
Fig. 8 is a cross section on line IV—IV, Fig. 6, the types and ink-ribbon device being removed for the purpose of convenient illustration.
Figure 9:
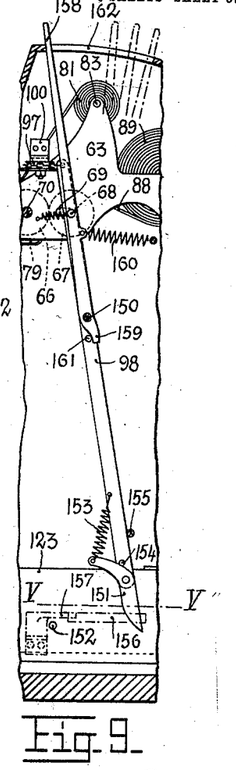
Fig. 9 shows the mechanism for returning the carriage.
Figures 10, 11, 12, 13:
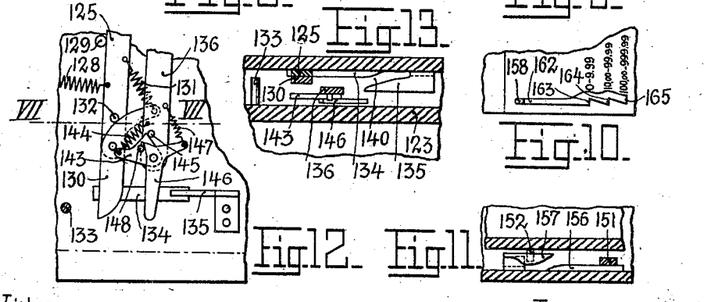
Fig. 10 is a plan view corresponding to a part of Fig. 9.
Fig. 11 is a horizontal section on line V—V, Fig. 9.
Fig. 12 is a section on line VI—VI, Fig. 8 drawn to an enlarged scale and showing the parts of the mechanism which are operated by the drawer in order to feed and wind up the ink-ribbon intermittently.
Fig. 13 is a horizontal section on line VII—VII, Fig 12.

The device by means of which the ink-ribbon is fed automatically after each transaction is shown in Figs. 6, 7, and 20, but as this device does not form part of my invention, it is unnecessary to describe the same. The said ink-ribbon 121 passes across the apparatus directly beneath the plane 79 and the paper band (see Fig. 20) and is wound up upon two drums 213, 214.

To sum up, the operation of the cash register is as follows:—The amount is printed by successively depressing down the keys 101 in question. Thus the amount is recorded upon the paper band and simultaneously it is indicated by the parts 204 in order to be observed by the operator. When finally the carriage comes to the last position to the right, the locking pawl 166 for the drawer is released and the drawer is pulled out. Then the paper band is fed forward and is directly thereupon wound tight upon the roller 81 so that the amount is visible to the purchaser through the glass 122. The drawer is now open and the money transaction may take place. Upon the drawer being pushed in, the carriage is returned to initial position and the drawer is locked by the pawl 166. Finally the operator depresses the button 212, and the amount indicating parts 204 which were lifted again fall down.

Having now described my invention, what I claim as new and desire to secure by Letters Patent is:

1. A cash register comprising a casing having an opening therein, a movable carriage carrying a paper strip, printing mechanism including keys, said keys operating the carriage, a drawer, means for feeding the paper strip past the opening when the drawer is opened, and means for stopping said feed after the drawer has moved a certain distance.

2. A cash register comprising a casing having an opening therein, a movable carriage carrying a paper strip, printing mechanism including keys, said keys operating the carriage, a drawer, means for feeding the paper strip past the opening when the drawer is opened, means for stopping said feed when the drawer has moved a certain distance, and means controlled by the movement of the drawer for returning the carriage to initial position.

3. A cash register comprising a carriage, a paper band supply roller carried thereby, two feed rollers journaled in the carriage, a roller carried by the carriage for receiving the paper from the feed rollers, means for actuating said receiving roller to take up the slack, printing mechanism including keys, means for moving the carriage from said keys, a drawer and means for feeding the paper actuated by the movement of the drawer.

4. A cash register comprising a casing, a drawer therein, a rod 70 extending from side to side of said casing, a paper carriage, two feeding rollers on said carriage, one of said rollers having sliding movement on the rod 70, a ratchet wheel on said rod, a pawl engaging with said ratchet wheel, and an oscillating double lever carrying said pawl and having its lower end engaged by the drawer on the outward movement of the latter, whereby said pinion will be rotated.

5. A cash register comprising a casing, a drawer therein, a paper carriage in said casing, feed rollers carried on said carriage, a roller on the carriage for receiving the paper from the feed roller, a pinion connected to the said receiving roller, and an oscillating double lever having a segment at its upper end engaging with said pinion and its lower end engaged by the drawer when the latter is pulled out.

6. A cash register comprising a casing, a drawer therein, a paper carriage, feed rollers in said carriage, a paper receiving roller in said carriage, a double lever for operating the feed rollers, a double lever for operating the receiving roller, the lower ends of said levers extending to a point adjacent the drawer, and a projection on said drawer for first engaging with the feed roller operating lever and then the receiving roller operating lever when the drawer is opened.

7. A cash register comprising a casing, a drawer therein, a paper carriage, feed rollers in said carriage, a paper receiving roller in said carriage, a double lever for operating the feed rollers, a double lever for operating the receiving roller, the lower ends of said levers extending to a point adjacent the drawer, a projection on said drawer for first engaging with the feed roller operating lever and then the receiving roller operating lever when the drawer is pulled out, and yielding means on the lower ends of said levers whereby the said levers are not operated on the backward movement of the drawer.

8. A cash register comprising a casing, a drawer, a carriage in said casing, paper feeding rollers on said carriage, a double lever for operating said feeding rollers, the lower end of said lever extending to a point adjacent the drawer, a projection on the drawer engaging with the lever when the drawer is moved outwardly, and a releasing nose attached to the wall of the casing and lying in the path of said lever and shaped to move said lever toward the side of the casing.

9. A cash register comprising a casing, a drawer, a paper carriage in said casing, paper feeding rollers on said carriage, a paper receiving roller on said carriage, a double lever engaging with said roller and having its lower end adjacent the drawer, a stop 135 on the lower end of said lever, a triangular piece 143 pivoted to said lower end of the lever, a spring for holding said piece in engagement with said stop, a bell crank piece 146 pivoted on the lower end of the lever, a stop 148 on the triangular piece, a weaker spring 147 for holding the bell crank piece in engagement with the stop 148, said bell crank piece having a downwardly projecting arm, and a projection on the drawer adapted to engage with the said downwardly projecting arm on the outward movement of the drawer.

10. A cash register comprising a casing, a drawer therein, a paper carriage movable in said casing, a spring connected to the carriage and normally holding said carriage at one end of its movement, an oscillating double lever, a flexible connection from said lever to the carriage, the lower end of said lever extending downwardly to a point adjacent the drawer, yielding means on said lever for permitting movement of the lever on the backward movement only of the drawer, and a projection on the drawer engaging the said means.

11. A cash register comprising a casing, a drawer, a carriage movable from one side of the casing to the other, a spring for normally holding the carriage at one side of the casing, a double lever on the opposite side of the casing, a flexible connection from said carriage to the lever, a bell crank piece on the lower end of said lever, a stop on said lever, a spring for holding said bell crank piece in engagement with said stop, a projection on the drawer engaging with said bell crank piece, said parts being so arranged that the lever is only operated on the backward movement of the drawer, and a releasing nose on the casing for releasing the bell crank piece from the projection.

12. A cash register comprising a casing, a drawer, a carriage movable in said casing, a lever for returning the carriage to the starting position, and means coöperating with said lever for varying said starting position of the carriage.

13. A cash register comprising a casing, a drawer, a paper carriage movable in the casing, printing mechanism for printing the numerals 1 to 9, nine striking pins carried by said carriage, means for operating said pins from the printing mechanism, indicating means having the numerals 1 to 9 thereon, and means for operating said indicating means from the said pins.

14. A cash register comprising a casing having an opening therein, a carriage carrying a paper strip and a numeral printing means including keys, said keys operating the carriage, a drawer, means for feeding the paper strip past the opening when the drawer is opened, means controlled by the movement of the drawer for returning the carriage to the initial position, indicating pins arranged in rows, striking pins carried by the carriage and adapted to engage with said indicating pins, and means for operating the striking pins from the keys.

In testimony whereof I have signed my name to this specification in the presence of two subscribing witnesses.

ALF HERRE HELTBERG.

Witnesses:
RICHARD STOKKE,
AXEL LAHN.